US007046833B2

(12) United States Patent
Masumoto et al.

(10) Patent No.: US 7,046,833 B2
(45) Date of Patent: May 16, 2006

(54) REGION EXTRACTING METHOD FOR MEDICAL IMAGE

(75) Inventors: Jun Masumoto, Suita (JP); Yoshinobu Sato, Suita (JP); Masatoshi Hori, Suita (JP); Takamichi Murakami, Suita (JP); Takeshi Johkoh, Suita (JP); Hironobu Nakamura, Suita (JP); Shinichi Tamura, Suita (JP); Masaki Miyamoto, Tokyo (JP)

(73) Assignee: AZE Ltd., Tokyo (JP)

( * ) Notice: Subject to any disclaimer, the term of this patent is extended or adjusted under 35 U.S.C. 154(b) by 673 days.

(21) Appl. No.: 10/151,030

(22) Filed: May 21, 2002

(65) Prior Publication Data
US 2002/0181754 A1     Dec. 5, 2002

(30) Foreign Application Priority Data
May 22, 2001    (JP)  ............................. 2001-152523

(51) Int. Cl.
 *G06K 9/00*     (2006.01)
(52) U.S. Cl. ..................................... 382/131
(58) Field of Classification Search ............... 382/128; 600/431
See application file for complete search history.

(56) References Cited
U.S. PATENT DOCUMENTS 5,833,947 A *  11/1998  Rocklage et al. .......... 424/9.36
6,208,883 B1 *  3/2001  Holupka et al. ............ 600/407
6,278,793 B1 *  8/2001  Gur et al. ................... 382/128
6,282,305 B1 *  8/2001  Huo et al. .................. 382/128
6,430,430 B1 *  8/2002  Gosche ....................... 600/410
2001/0056233 A1 *  12/2001  Uber et al. ................. 600/431

OTHER PUBLICATIONS

Vannier, Michael W., et al., "Multispectral Analysis of Magnetic Resonance Images," *Radiology*, Jan. 1985, pp. 221-224.
"The Present Situation of Practical Use of JETT Scan CT," *Image Data for Medical*, combined issue of Oct. 1994 and Mar. 1995, pp. 44-49.
Masumoto, Jun, "Automatic Liver Segmentation Using Different Time Series of Multi-Slice CT Images," IEICE Technical Report, Institute of Electronics, (Nov. 1999), pp. 51-58.

* cited by examiner

*Primary Examiner*—Samir Ahmed
*Assistant Examiner*—O'Neal R. Mistry
(74) *Attorney, Agent, or Firm*—Snider & Associates; Ronald R. Snider

(57) ABSTRACT

From CT images having captured an abdomen, a two-dimensional characteristic space is assumed, in which X and Y axes indicate CT values of image data taken in first and second time phases different from each other. In this space, a two-dimensional histogram concerning respective pixels located at the same position in the two time phases is taken as a sample distribution of pixels. A two-variable distribution function is applied to this sample distribution, so as to estimate a matrix distribution of pixels corresponding to the whole liver region. According to this matrix distribution, a range of CT value of pixels corresponding to the liver region is estimated.

3 Claims, 15 Drawing Sheets

F I G. 4 A
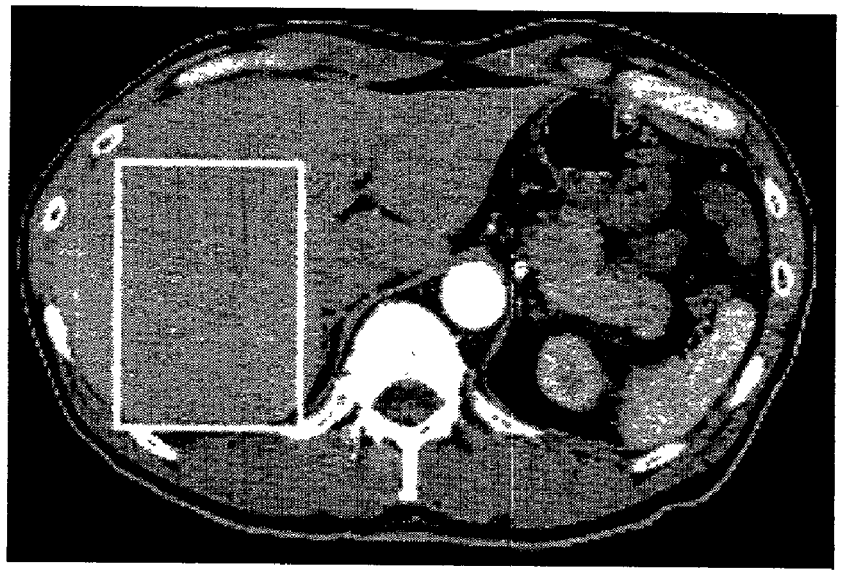
F I G. 4 B
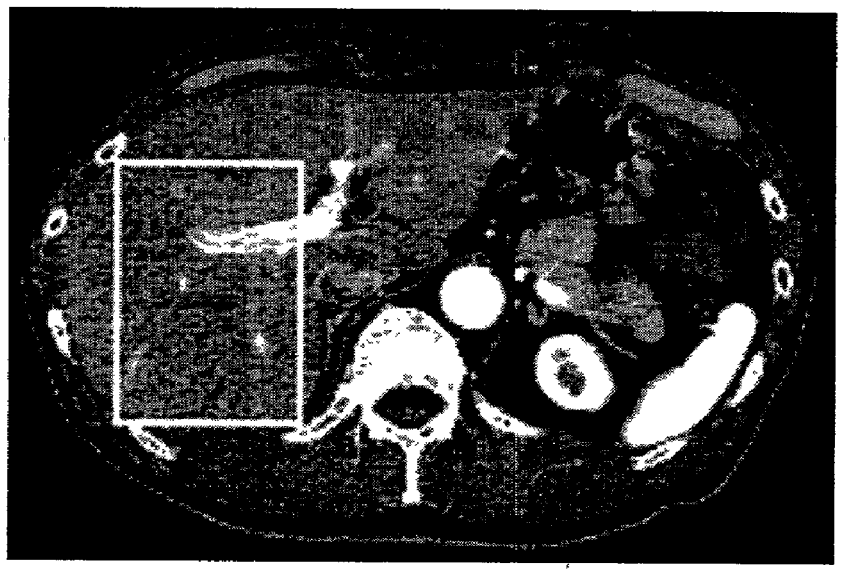

F I G. 8

F I G. 1 1 A
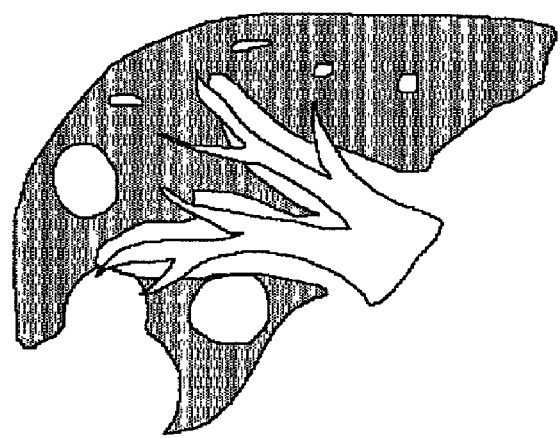
F I G. 1 1 B
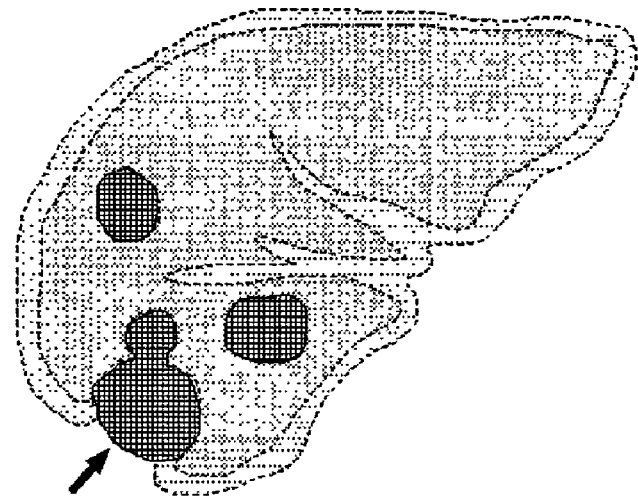

F I G. 1 3
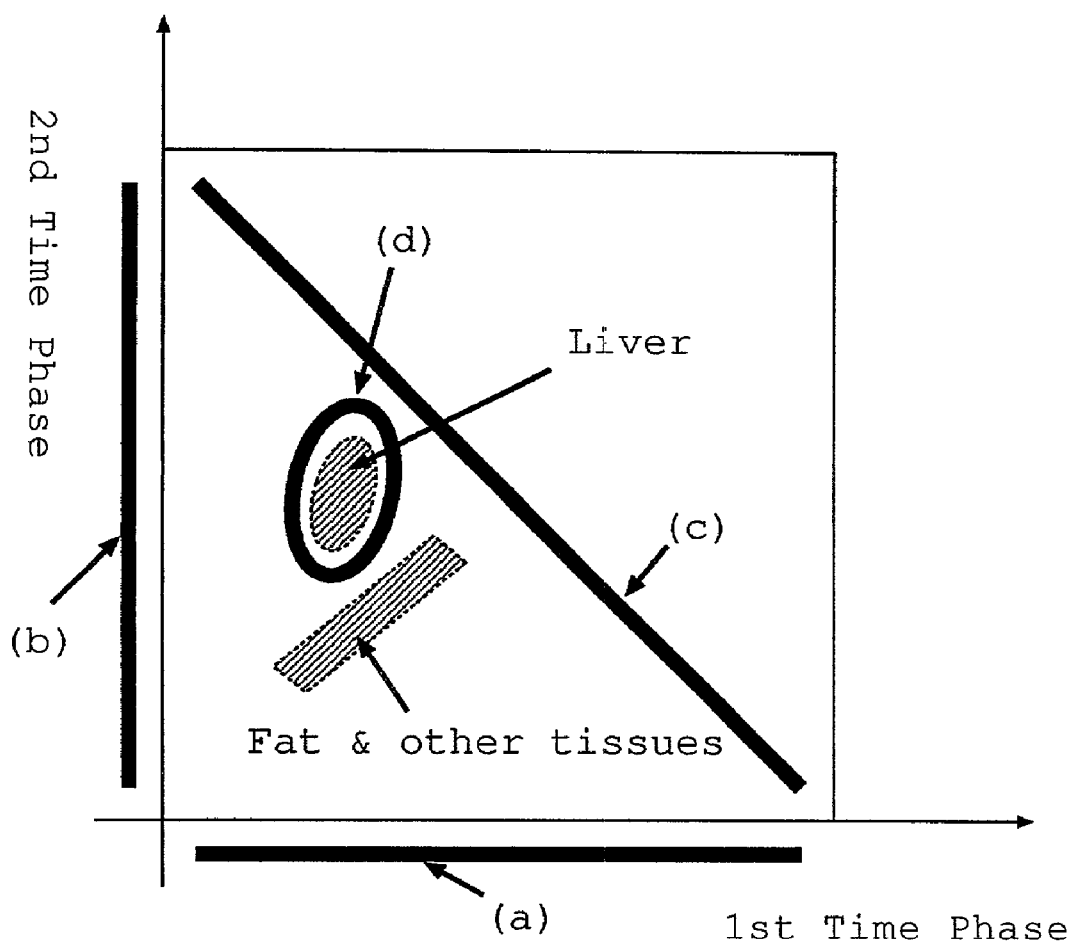

REGION EXTRACTING METHOD FOR MEDICAL IMAGE

RELATED APPLICATIONS

This application claims the priority of Japanese Patent Application No. 2001-152523 filed on May 22, 2001, which is incorporated herein by reference.

BACKGROUND OF THE INVENTION

1. Field of the Invention

The present invention relates to a region extracting method for medical images in which regions of organic parts such as organs including liver and pancreas, blood vessels, tumors, and the like are extracted by image processing from medical images taken by use of radiation diagnosis systems such as CT (computed tomography), MRI (magnetic resonance imaging), nuclear medicine, CR (computed radiography), DSA (digital subtraction angiography), and DR (real-time radiography).

2. Description of the Prior Art

While CT and MRI, for example, have conventionally been known as radiation medical diagnosis systems, the technical progress in these fields has recently made it possible to take high-resolution images in a short time. In the field of CT, for example, with multislice CT coming into practical use, an organ such as liver as a whole can be photographed twice in a single respiration-holding time.

Since it has become possible to attain high-resolution images in a short time as such, there has been an increasing demand for extracting regions of organic parts such as organs and tumors from thus captured images, visualizing them to facilitate their viewing for patients and academic uses in terms of explanation, quantifying them so as to measure their volume, and using them for various purposes such as the making of surgery plans. In many cases, however, radiologists and the like have manually been extracting regions of organic parts from the captured images while seeing the images sheet by sheet. Therefore, in the CT of liver in which hundreds of images are taken at one time, enormous labors are necessary in terms of time and mental efforts to extract the whole liver region.

In view of such a background, studies for automatically extracting predetermined organic regions from medical images by use of machines such as computers have vigorously been carried out in regions such as lung field and brain in particular, from which contours and lesions are relatively easy to extract. However, automatic extractions in regions hard to extract have not yielded sufficient results yet. Known as a method of automatically extracting a liver region from an abdomen-contrasted CT image, for example, are a method comprising the steps of making a histogram of respective concentration values of pixels from data of a single image and extracting the liver region by threshold processing, and a method comprising the steps of carrying out threshold processing by using a partial histogram and approximating a contour with a spline curve.

However, these conventional methods may not be reliable in the detection in areas about the liver such as parts in contact with surrounding tissues such as spleen having a CT value on a par with that of liver, parts having uneven CT values within the same liver region, and parts in which low-concentration lesions exist in the contour area. In particular, their failure to attain the reliability of determining a liver region in areas where the liver and surrounding tissues are in contact with each other has been a large obstacle to practical use.

Therefore, in view of the state where, with multislice CT coming into practical use, the whole liver region can be photographed twice in a single respiration-holding time, whereby respective images in two time phases with different circulating statuses of a contrast medium can be obtained without any positional shift of organs, the inventors have proposed a method of automatically extracting a liver region by using image data of two time phases in which the liver region is captured at substantially the same position (IEICE Technical Report MI99-39 (1999-11), P51–P58).

In the above-mentioned method, from respective concentration values of pixels located at the same position between images in two time phases concerning the same liver region different from each other in terms of time from when the contrast medium is injected until imaging, a two-dimensional histogram having coordinates based on respective concentration values of images is determined, a distribution range of pixel concentration value corresponding to the liver region is estimated from the distribution status of this two-dimensional histogram, and the liver region is extracted according to this estimation.

It has been found out that the above-mentioned method yields results better than those in a conventional method in which the liver region is extracted from data of a single image. Thereafter, some follow-up experiments concerning the above-mentioned method have revealed that the correlation of pixel concentration values in the liver region between different time phases may differ greatly among patients even when the images are taken under similar conditions.

SUMMARY OF THE INVENTION

In view of the foregoing circumstances, it is an object of the present invention to provide a region extracting method for a medical image by which a region of a predetermined organic part can be extracted uniquely in a stable fashion from images captured for medical use. In particular, it is an object of the present invention to provide a region extracting method for a medical image which can automate an operation of extracting a liver region from CT images using a contrast medium, whereby the efficiency of extracting operation can be improved.

For overcoming the problems mentioned above, the present invention provides a region extracting method for a medical image, in which a region of a predetermined organic part is extracted from an image captured for medical use, the method comprising the steps of determining from data of a plurality of images in which substantially the same region of the organic part is captured under measurement conditions different from each other measurement values concerning predetermined characteristics set for respective images concerning respective pixels located at positions corresponding to each other between the images; determining, in a multi-dimensional characteristic space defined by a plurality of coordinates indicating the respective measurement values of the images, a sample distribution of the pixels relating to the region of the organic part employing respective measurement values of the characteristics as coordinate values, and applying a distribution function taking account of a correlation between the respective characteristics of the images to the sample distribution so as to estimate a matrix distribution range corresponding to a predetermined tissue region belonging to the organic part; and extracting an assembled area of the pixels included in the matrix distribution range in each of the images as a region corresponding to the tissue region.

The above-mentioned "organic part" refers to organs of animals such as internal organs including liver and lungs, circulatory organs like heart, and nerve systems such as brain, lesions such as tumors, and the like.

The above-mentioned "measurement state" refers to photographing techniques themselves such as CT and MRI, measurement conditions such as photographing time and numerical settings in taking apparatus, measuring objects such as colors in color images, and the like.

The above-mentioned "predetermined characteristic" refers to characteristics linking an object to be photographed and pixels to each other, such as the concentration value per pixel in monochromatic images, and concentration values for respective colors such as red, green, and blue in color images.

In the present invention, "pixel" refers to each region obtained by finely dividing an image area, and is not restricted to its usual meaning, i.e., the minimum unit (picture cell or picture element) constituting a digital image. The above-mentioned "respective pixels located at positions corresponding to each other between the images" refer to pixels corresponding to the same region of the organic part to be extracted, and can be regarded as pixels at the same position in the case where the organic part is captured at substantially the same position between the images.

In the region extracting method for a medical image in accordance with the present invention, an area relating to the region of the organic part may be specified beforehand in each of the images, a distribution in the characteristic space may be determined concerning the pixels located within the specified area alone, and thus determined distribution may be employed as the sample distribution.

Alternatively, a distribution in the characteristic space may be determined concerning pixels in the whole image area of each image, and a range of the sample distribution may be specified in the characteristic space.

As the characteristic in each of the images, the concentration value of each pixel may be used. The region extracting method for a medical image in accordance with the present invention is suitable when each image is a CT image, whereas the plurality of images are those in respective time phases different from each other in terms of time from when a contrast medium is injected until imaging.

In the case where the organic part is a liver, whereas the sample distribution is a two-dimensional histogram concerning the respective concentration values of pixels in images of two different time phases, it is preferred that the distribution function be a two-variable normal distribution function.

The two time phases different from each other may be a first arterial phase captured immediately after a contrast medium is injected into the liver and a second arterial phase captured after several tens of seconds from the contrast medium injection in a single respiration-holding time.

The images may be multislice CT images.

BRIEF DESCRIPTION OF THE DRAWINGS

FIGS. 4A and 4B are views showing respective pixel ranges concerning a liver region in the images shown in FIGS. 1A and 1B;

FIG. 8 is a view showing an example of images after binarization processing;

FIGS. 11A and 11B are schematic views showing an image processing procedure subsequent to FIGS. 10A and 10B;

FIG. 13 is a schematic chart showing a fundamental relationship between each comparative method and the method of the present invention;

DESCRIPTION OF THE PREFERRED EMBODIMENTS

In the following, the region extracting method for a medical image in accordance with an embodiment of the present invention will be explained with reference to the drawings.

The method in accordance with this embodiment is one automatically extracting a liver region from multislice CT images in which an abdomen is captured. As images for extracting the region, two image series taken in respective time phases different from each other, specifically, an image series of a first arterial phase captured immediately after a contrast medium is injected into a liver (hereinafter referred to as first time phase) and an image series of a second arterial phase captured after several tens of seconds from the contrast medium injection (hereinafter referred to as second time phase), are employed. The individual images of these two image series are captured in a single respiration-holding time, whereas two images corresponding to each other (capturing the same sectional position) between the image series capture substantially the same region of the liver at substantially the same position within the image area. FIGS.

Figure 1A:
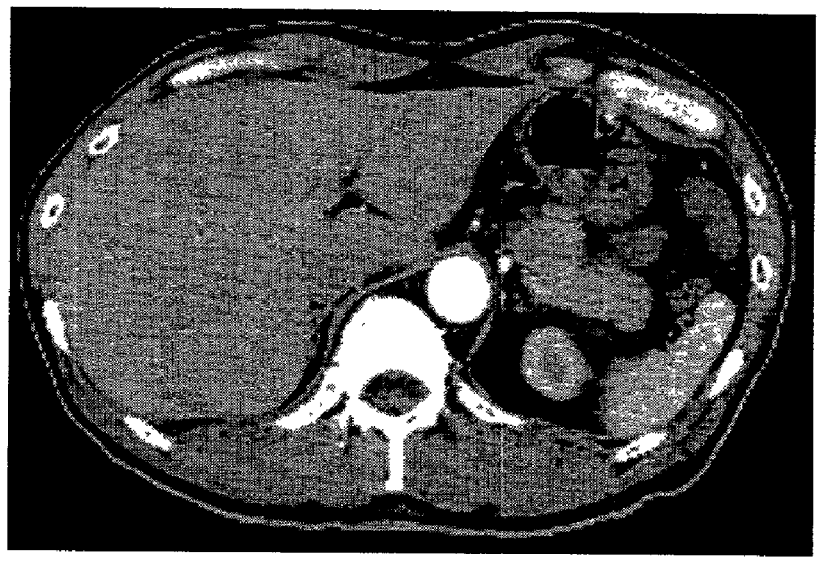
FIGS. 1A and 1B are views showing examples of CT images corresponding to each other in two time phases.

1A and 1B show examples of such images corresponding to each other in two time phases. FIG. 1A is an example of image in the first time phase, whereas FIG. 2A is an example of image in the second time phase.

Figure 1B:
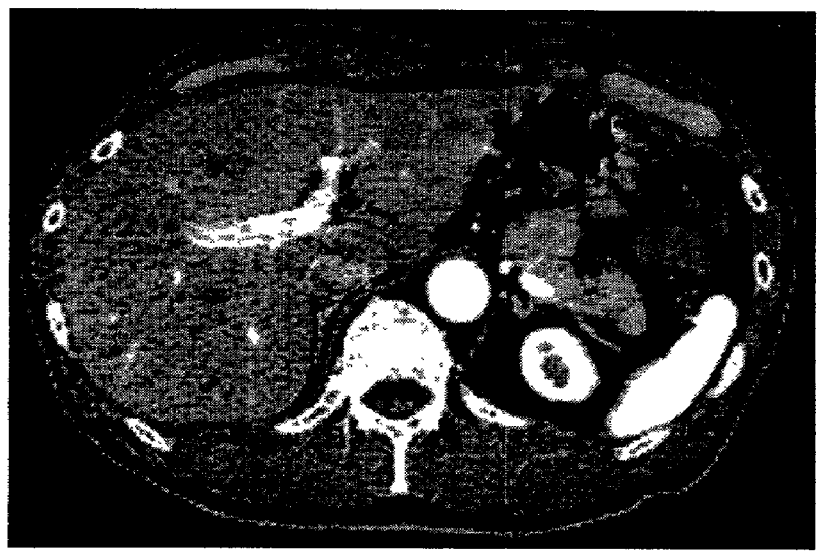
Figure 2A:
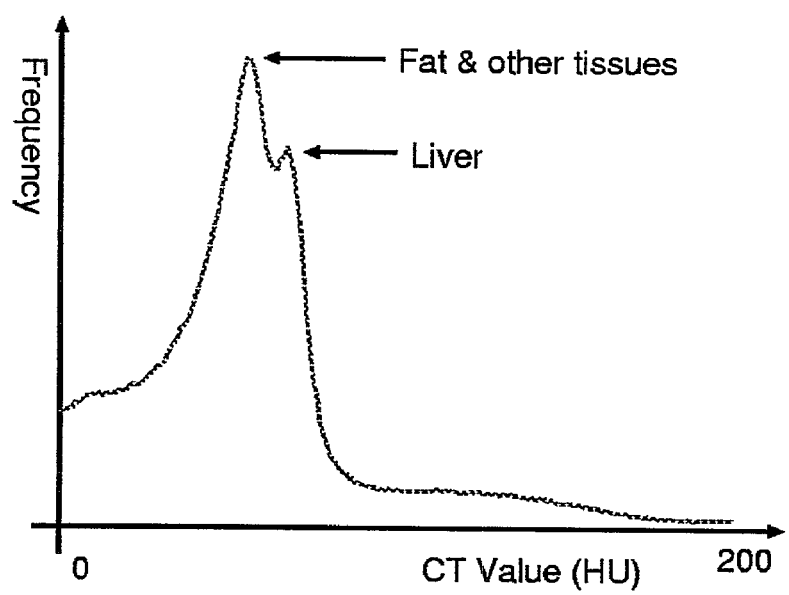
FIGS. 2A and 2B are histograms concerning CT values of individual pixels in the images shown in FIGS. 1A and 1B, respectively.
Figure 2B:
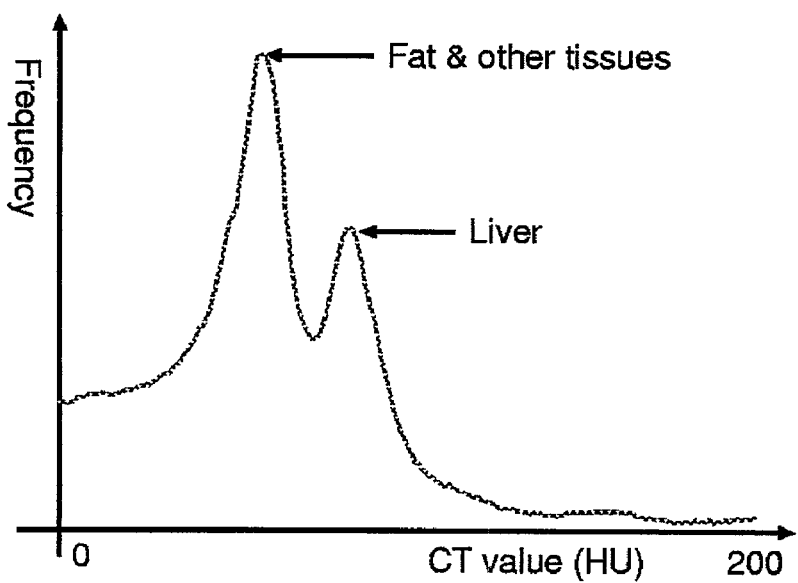

FIGS. 2A and 2B are histograms concerning CT values of individual pixels in the images shown in FIGS. 1A and 1B, respectively. In each graph, the abscissa indicates CT value as a concentration value, whereas the ordinate indicates frequency. As can be seen from the histogram of FIG. 2A obtained from the image data of FIG. 1A, the contrast medium does not penetrate into the liver region immediately after the injection thereof, whereby the CT value of the liver region is substantially on a par with that of other organic parts such as fat and muscles. By contrast, as can be seen from the histogram of FIG. 2B obtained from the image data of FIG. 1B, the CT value of the liver region after several tens of seconds from the contrast medium injection is higher than that of the other tissues. Thus, the image data of the first and second time phases differ from each other in terms of the distribution of concentration values of individual pixels concerning the liver region.

Figure 3:
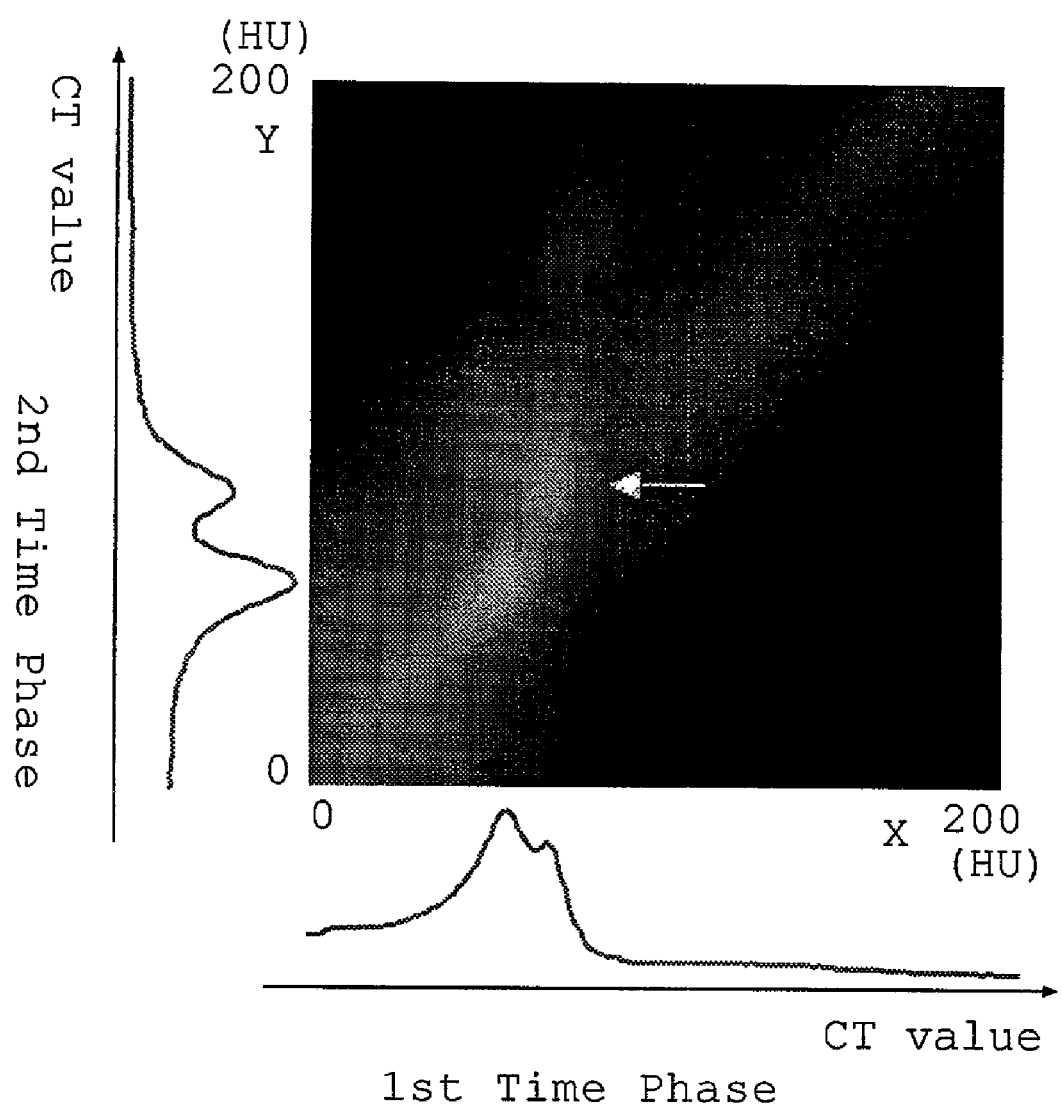
FIG. 3 is a two-dimensional histogram concerning CT values of individual pixels in the images shown in FIGS. 1A and 1B.

In the method of this embodiment, as shown in FIG. 3, a two-dimensional characteristic space in which the CT values of image data in the first and second time phases are indicated by X and Y axes, respectively, is assumed, and a two-dimensional histogram in which frequencies of CT values concerning pixels located at the same position in the images of two time phases are represented in terms of luminance value is determined in this space.

In FIG. 3, a two-dimensional distribution of CT values is determined for the pixels in the whole region of each of the images shown in FIGS. 1A and 1B, whereby all the pixels will be distributed on the line of Y=X if CT values do not vary between the two images. However, the CT value of liver region becomes higher in the second time phase, thereby exhibiting a distribution status different from that of the other tissues as indicated by the arrow in FIG. 3. A distribution range relating to the region of a predetermined organic part may be determined in the characteristic space when there is a characteristic in the distribution status in the characteristic space as such. In FIG. 3, with an area near the arrow being specified as a distribution range of pixels corresponding to the liver region, the inside of this specific range can be taken as a sample distribution corresponding to the liver region. This method can be used in cases where respective sample distributions of pixels relating to regions of a plurality of organic parts different from each other, e.g., liver and pancreas, are to be determined in one characteristic space.

Figure 5:
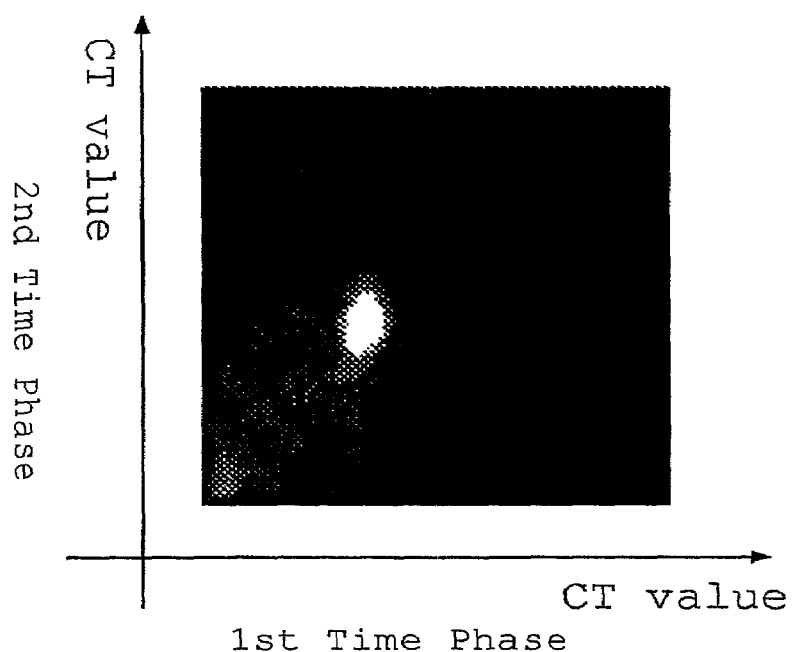
FIG. 5 is a two-dimensional histogram concerning CT values of individual pixels within the pixel range specified in FIGS. 4A and 4B.

On the other hand, as shown in FIGS. 4A and 4B, a pixel range most of which is clearly located within a liver region may be specified beforehand as a pixel range relating to the liver region (hereinafter referred to as "VOI range"), a two-dimensional histogram in the two-dimensional characteristic space may be determined concerning the pixels within thus specified range alone as shown in FIG. 5, and this distribution may be taken as a sample distribution of pixels corresponding to the liver region. FIGS. 4A and 4B are views showing pixel ranges relating to pixel ranges relating to the liver region in the images shown in FIGS. 1A and 1B, respectively. Namely, FIGS. 4A and 4B show images in the first and second time phases, respectively. Since a region belonging to an organic part such as liver is specified on CT original images, this method is easily applicable to cases where doctors and the like are allowed to specify the VOI range by operations, and the like. When the VOI range is appropriately specified on the original image, information of pixels corresponding to regions of organic parts other than the liver is hardly included, whereby it is advantageous in that correct determinations are easier to carry out.

Figure 6:
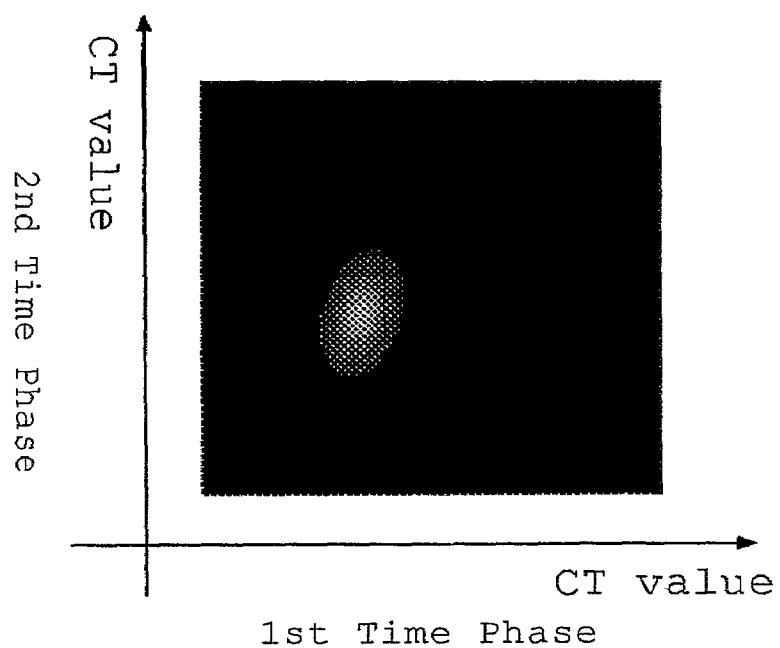
FIG. 6 is a view showing a matrix distribution estimated from the two-dimensional histogram of FIG. 5.
Figure 7A:
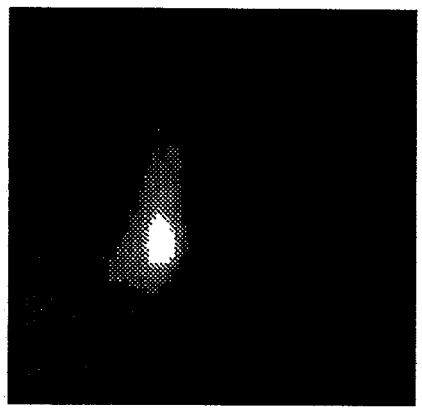
FIGS. 7A to 7F are views showing examples of the two-dimensional histograms shown in FIG. 5 concerning a plurality of other patients.
Figure 7B:
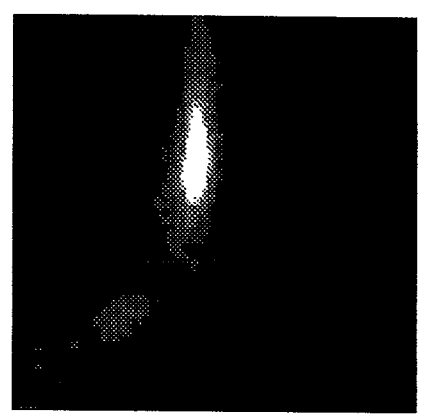
Figure 7C:
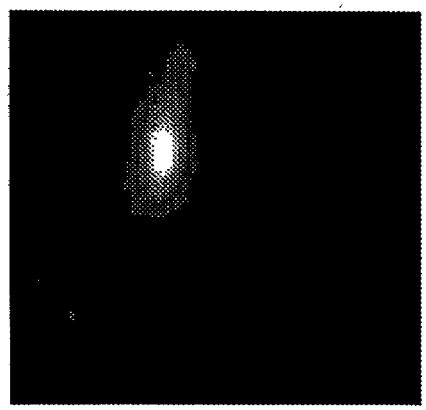
Figure 7D:
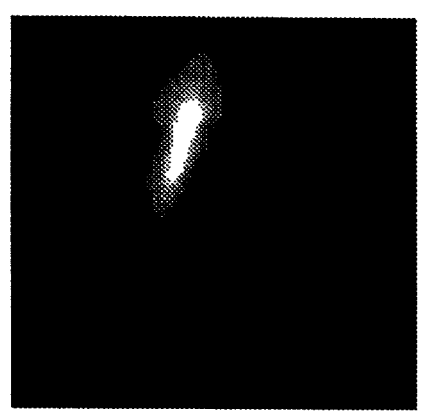
Figure 7E:
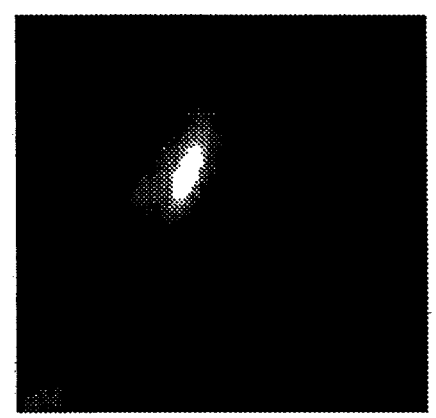
Figure 7F:
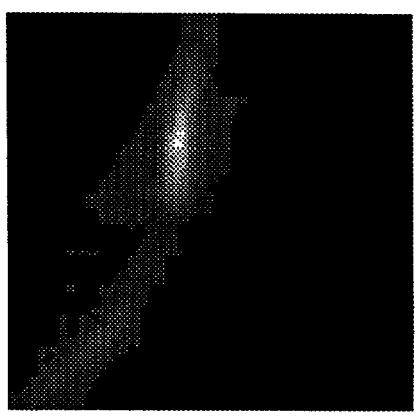

After the sample distribution is determined, a matrix distribution taking the assembly of pixels corresponding to the whole liver region as a matrix is estimated from thus determined sample distribution. FIG. 6 shows the matrix distribution estimated from the two-dimensional histogram of FIG. 5. The matrix distribution is estimated as follows:

The correlation between the CT value of pixels corresponding to the liver region in the image of the first time phase and the CT value of pixels corresponding to the liver region in the image of the second time phase varies among patients. FIGS. 7A to 7F show respective two-dimensional histograms concerning CT values of pixels corresponding to the liver region in a plurality of patients different from each other.

Therefore, in order to make it possible to take account of the above-mentioned correlation, it is assumed in the method of this embodiment that the matrix distribution is a two-variable normal distribution. Namely, letting $Y_{1+2}(x)$ be a matrix distribution function, $Y_{1+2}(x)$ is represented by the following expression (1):

$$Y_{1+2}(x) = L(v) = \exp\left[-\frac{1}{2}(v-\overline{v})^T \Sigma^{-1}(v-\overline{v})\right] \quad (1)$$

where $v$ is the random variable vector expressed by $$v = \begin{pmatrix} p_1(x) \\ p_2(x) \end{pmatrix},$$

$\overline{v}$ is the average value vector of $v$ within three times the half width (width from the center to a position where the frequency value becomes 0.5) centered at the modal position when the modal frequency value of $v$ in the sample distribution is taken as 1 (normalized with the lowest value taken as 0), and $\Sigma$ is the covariance matrix.

Then, the distribution determined by the above-mentioned expression (1) is taken as the matrix distribution. Though the distribution determined by the above-mentioned expression (1) from the sample distribution is taken as it is as the matrix distribution in the method of this embodiment, the distribution determined by the above-mentioned expression (1) may be optimized by use of the maximum likelihood method, and thus optimized distribution may be taken as the matrix distribution.

The distribution status of CT values in the liver region may vary greatly among patients. It has been found that the correlation between the CT values of time phases greatly varies as shown in FIGS. 7A to 7F under the influence of both the distribution status of CT value inherent in patients and the penetrating rate of contrast medium in the above-mentioned two-dimensional characteristic space in particular. According to the method of this embodiment, fluctuations in the distribution status of CT value among the patients can automatically be estimated.

Subsequently, in thus estimated matrix distribution, a range corresponding to the liver region is estimated. A threshold value $T_{1+2}$ determined beforehand with respect to the matrix distribution is employed for this estimation. As the threshold value $T_{1+2}$, a value of 0.05 or the like is selected with respect to the modal value 1 in the matrix distribution, for example, and an assembled region of pixels whose CT values have coordinates falling within the range from the value of 0.05 or the like, at which the frequency value of the matrix distribution has been selected, to 1 is extracted as a pixel region corresponding to normal substantial tissues of the liver (tissues occupying the most part of the liver excluding blood vessels, tumors, and the like). Specifically, pixels having CT values within and outside the above-mentioned range are discriminated from each other by binarization processing, and the region of normal substantial tissues of the liver is extracted. FIG. 8 shows an example of images after the binarization processing.

Figure 9A:
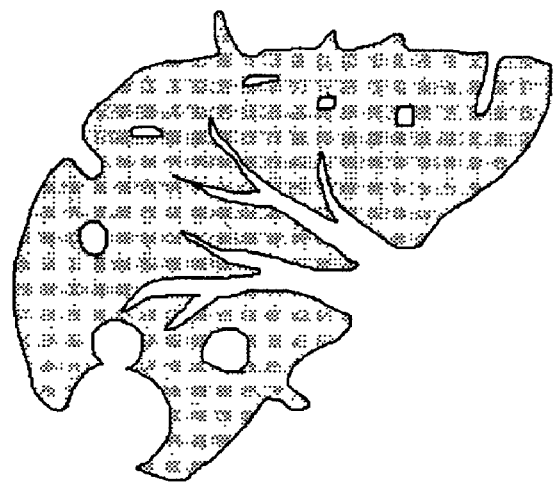
FIGS. 9A and 9B are schematic views showing an image processing procedure for estimating a final liver region.
Figure 9B:
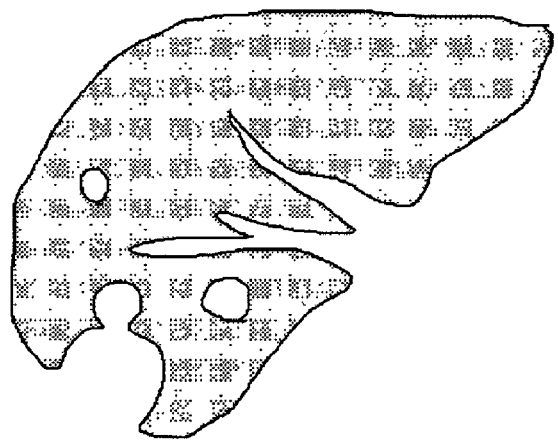
Figure 10A:
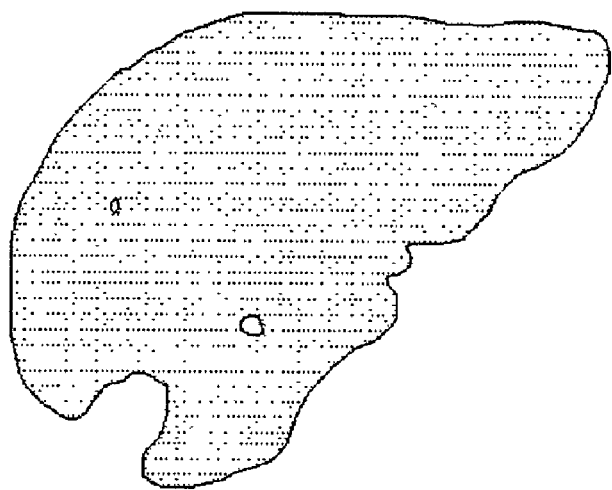
FIGS. 10A and 10B are schematic views showing an image processing procedure subsequent to FIGS. 9A and 9B.
Figure 10B:
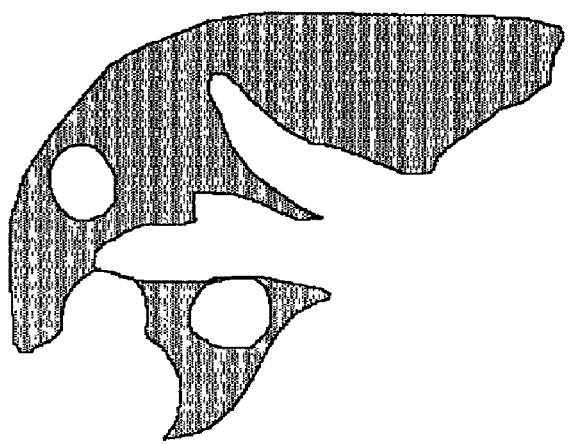
Figure 12A:
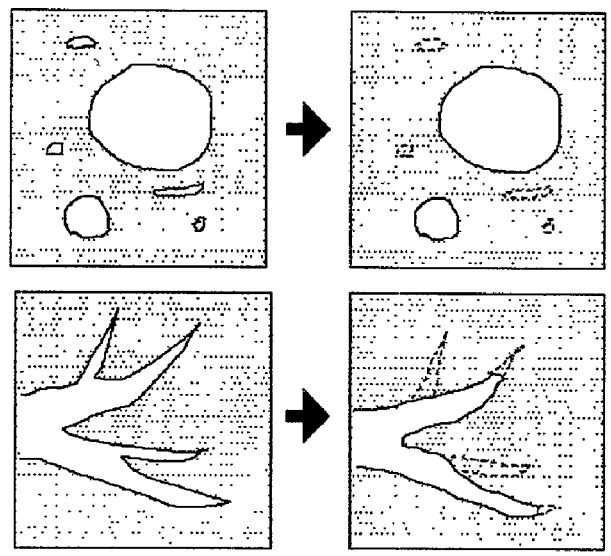
FIGS. 12A and 12B are schematic views showing details of a final image processing procedure.

In the following, an image processing procedure for estimating a final liver region from thus obtained image of normal substantial tissue region of the liver will be explained with reference to FIGS. 9A to 12B. FIG. 9A schematically shows an image of the normal substantial tissue region of the liver after the binarization processing. This image is subjected to opening processing (using a sphere with a radius of 4 mm as a setting parameter, for example), and unnecessary regions in contact with the contour portion of the liver region are deleted. Further, closing processing (using a sphere with a radius of 4 mm as a setting parameter, for example) is carried out, so as to fill thin blood vessels within the liver and small voids formed due to fluctuations in CT values, thereby extracting a substantial liver region such as the one shown in FIG. 9B. In this processing, as shown in FIG. 12A, thin blood vessels within the liver region are incorporated in the substantial region, whereas relatively large round objects such as tumors are left as they are in their bored state.

Subsequently, blood vessels and tumor masses having a high concentration tinted mainly under the influence of the contrast medium are extracted. The following image processing is carried out by use of the image in the second time phase. First, the image of the substantial liver region obtained in the previous stage is subjected to dilation processing (using a sphere with a radius of 2.68 mm as a setting parameter, for example) and erosion processing (using a sphere with a radius of 4 mm as a setting parameter, for example), so as to determine the maximum liver region shown in FIG. 10A and the minimum liver region shown in FIG. 10B. Subsequently, candidates for blood vessels and tumor masses to be added are extracted by use of the following threshold, so as to perform labeling processing for connected components.

threshold value: $\bar{I}_2 + k\sigma_2$ where $\bar{I}_2$ is the average of CT values within three times the half width centered at the modal CT value assuming the distribution concerning CT values of pixels within a VOI range in the image in the second time phase to be a one-dimensional normal distribution, and $\sigma_2$ is the standard deviation.

Among these candidates, connected components transmitted through the minimum liver region are extracted without reservation. Relatively thin blood vessels are included in the substantial liver region due to the substantial region extracting processing as shown in FIG. 12A. Therefore, as shown in FIG. 11A, the extracted thin parts of blood vessels are transmitted through the minimal liver region, whereby the blood vessels are added to the liver region. Here, in order to prevent unnecessary regions from being added, the adding region is restricted to the inside of the maximum liver region.

Figure 12B:
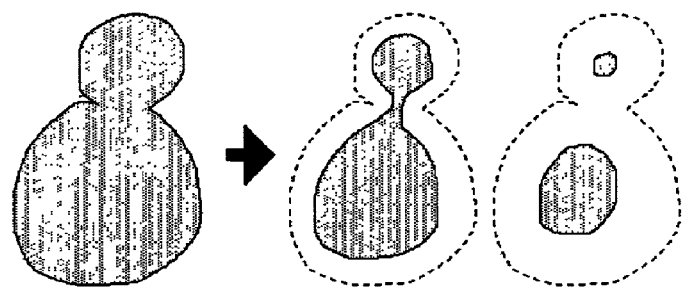
Figure 14:
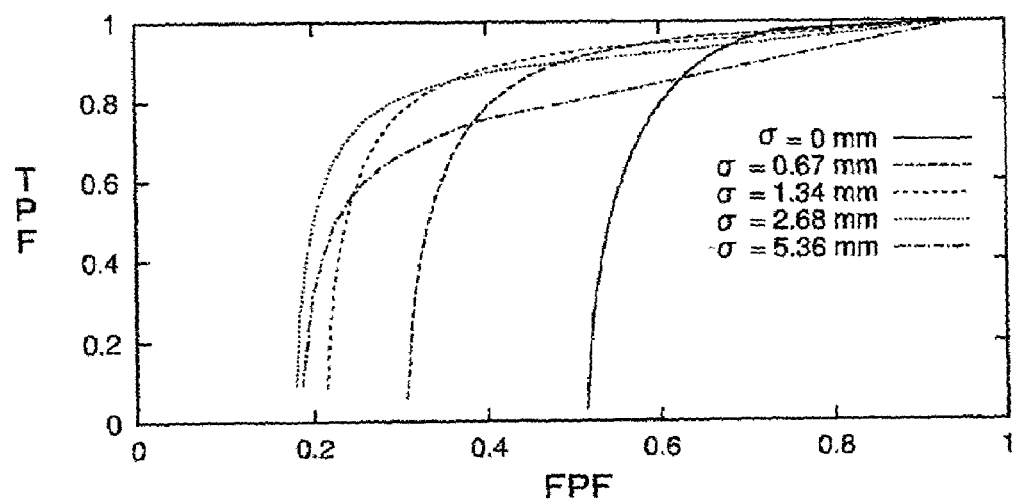
FIG. 14 is a graph showing ROC curves of the first comparative method in a stage of extracting a normal substantial tissue region of a liver.
Figure 15:
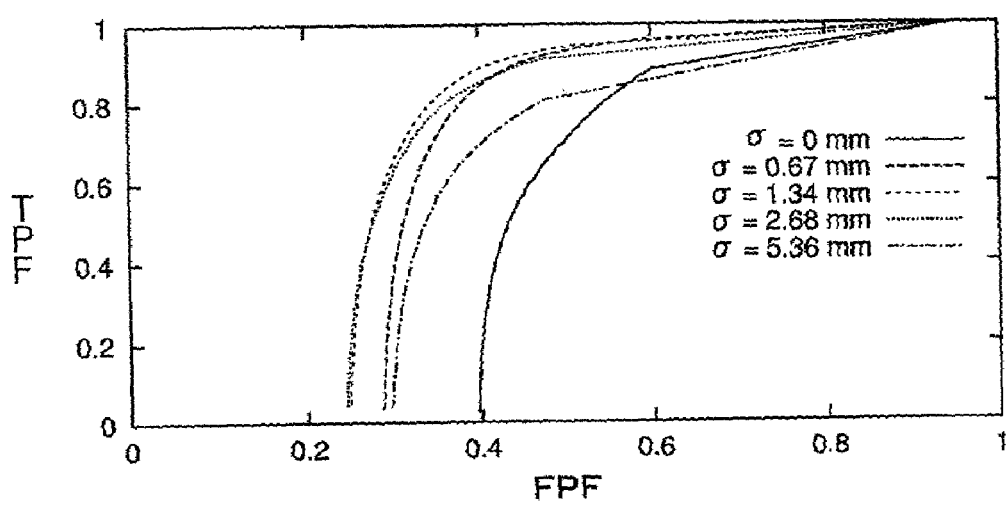
FIG. 15 is a graph showing ROC curves of the second comparative method corresponding to FIG. 14.
Figure 16:
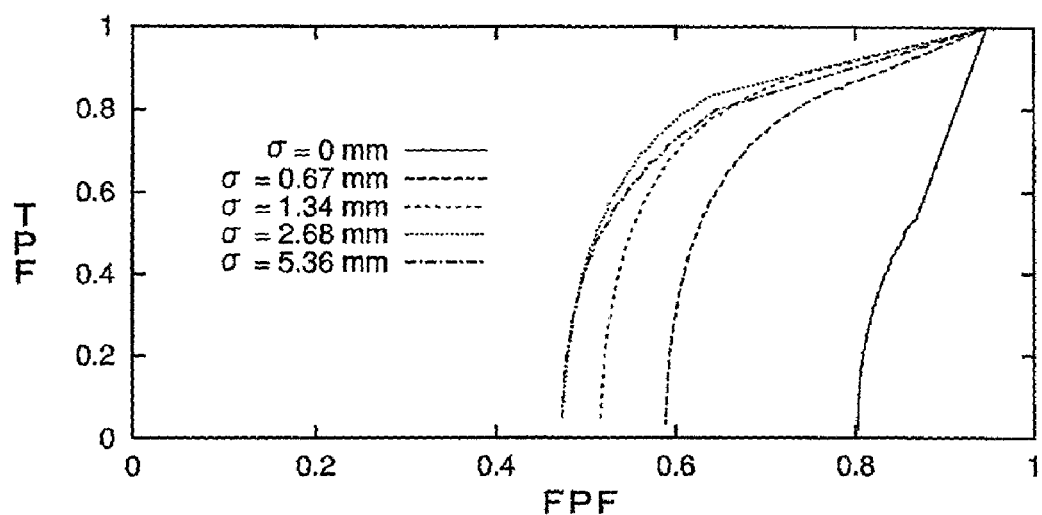
FIG. 16 is a graph showing ROC curves of the third comparative method corresponding to FIG. 14.
Figure 17:
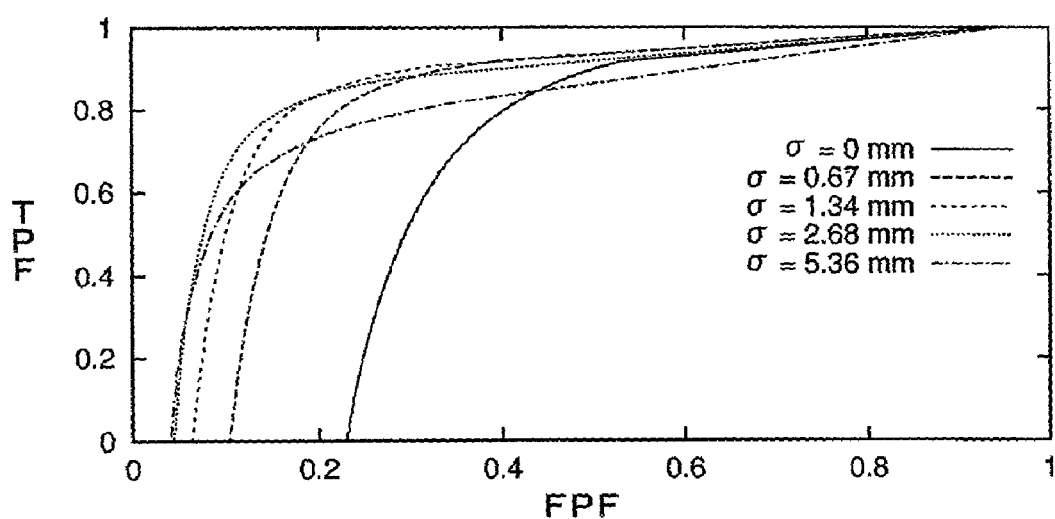
FIG. 17 is a graph showing ROC curves of the method of the present invention corresponding to FIG. 14.

Next, candidates having no overlapping part with the minimum liver region but with the maximum liver region are considered. They are mainly concerned with relatively large tumor masses formed within the liver and in the contour part thereof as shown in FIG. 11B. Hence, utilizing the fact that tumor masses have a spherical form in general, the degree of sphericity is calculated for these candidates. In the case where a true lesion is in contact with another true lesion or an unnecessary region (e.g., a rib) when measuring the degree of sphericity, thus measured degree of sphericity becomes lower as in the part indicated by arrow in FIG. 11B. For preventing this phenomenon from occurring, when calculating the degree of sphericity of each candidate, images are subjected to erosion processing beforehand, so as to separate the contact parts from each other. Taking account of cases where contact parts are large, this operation is performed, for example, in three different manners (using 0.67 mm, 1.34 mm, and 2.01 mm as radius parameters, for example), so as to improve the reliability of extracting true tumor masses as shown in FIG. 12B.

The tumor mass candidates extracted by this processing is subjected to dilation processing in the same form as that in the erosion processing, so as to restore their original size. When performing threshold processing (using 0.5 (maximum value being 1) as a setting parameter, for example) with respect to the degree of sphericity, a threshold value for volume (using a sphere of 3 mm$^3$ as a setting parameter, for example) is set at the same time, so as to exclude finely-divided minute connected parts.

Low-concentration tumor masses such as cysts exhibit a given low CT value since their inside is water. Therefore, with a fixed threshold (e.g., 60 HU) set separately, the extraction is carried out by the same method as that used for high-concentration tumor masses. The final liver region is estimated by the foregoing procedures. Though one image is explained by way of example in each of the first and second time phases, these processing operations are carried out for all the images captured in a single CT taking session while using their corresponding images of first and second time phases in practice.

Evaluations carried out concerning this embodiment of the method in accordance with the present invention will now be explained. For evaluation, nine cases (two series of 512×512×159 (with FOV=36.5 mm, slice thickness of 2.5 mm, and a reconstructed interval of 1.25 mm) were selected, and an image (256×256×147) in which voxel intervals were squared and contracted to half was used for the image of each case. As a CT apparatus, Light Speed QX/i (GE Yokogawa Medical Systems, Ltd.) was used. Among the nice cases, no tumor mass existed in the CT image in one case, whereas at least one tumor mass existed in each of the other cases. As answer data, the liver region manually extracted by a radiologist was used.

Selected as comparative examples for evaluation were a method using data of image series in the first time phase alone (first comparative method) and a method using data of image series in the second time phase alone (second comparative method) as conventional methods, and a method using a differential image between the first and second time phases (third comparative method) as a technique using data of image series in both time phases.

These comparative methods will now be explained in brief.

First Comparative Method

In this method, a one-dimensional histogram concerning CT values of individual pixels within the VOI region in the image of the first time phase, such as the one shown in FIG. 4A, is taken as a sample distribution, and a matrix distribution estimated from this sample distribution is assumed to be a one-dimensional normal distribution. Namely, letting $Y_1(x)$ be the matrix distribution function, $Y_1(x)$ is represented by the following expression (2):

$$Y_1(x) = \exp\left\{-\frac{1}{2\sigma_1^2}[I_1(x) - \bar{I}_1]^2\right\} \quad (2)$$

where $I_1(x)$ is the CT value of pixels in the first time phase, $\bar{I}_1$, is the average CT value within three times the half width (width from the center to a position where the frequency value becomes 0.5) centered at the modal position when the frequency value of the modal CT value in the sample distribution is taken as 1 (normalized with the lowest value taken as 0), and $\sigma_1$ is the standard deviation.

Then, the distribution determined by the above-mentioned expression (2) is presumed to be a matrix distribution, and a range corresponding to the liver region is estimated in thus presumed matrix distribution. For this estimation, a threshold $T_1$ determined beforehand with respect to the matrix distribution is employed. A value of 0.2 or the like is used with respect to the modal value of 1 in the matrix distribution, for example, as the threshold $T_1$, and the assembled region of pixels whose frequency value in the matrix distribution falls within the range from 0.2 to 1 is extracted as a pixel region corresponding to normal substantial tissues of the liver.

Second Comparative Method

In this method, a one-dimensional histogram concerning CT values of individual pixels within the VOI region in the image in the second time phase, such as the one shown in FIG. 4B, is taken as a sample distribution, and a matrix distribution estimated from this sample distribution is assumed to be a one-dimensional normal distribution. Namely, letting $Y_2(x)$ be the matrix distribution function, $Y_2(x)$ is represented by the following expression (3):

$$Y_2(x) = \exp\left\{-\frac{1}{2\sigma_2^2}[I_2(x) - \bar{I}_2]^2\right\} \quad (3)$$

where $I_2(x)$ is the CT value of pixels in the second time phase, $\bar{I}_2$ is the average CT value within three times the half width (width from the center to a position where the frequency value becomes 0.5) centered at the modal position when the frequency value of the modal CT value in the sample distribution is taken as 1 (normalized with the lowest value taken as 0), and $\sigma_2$ is the standard deviation.

Then, the distribution determined by the above-mentioned expression (3) is presumed to be a matrix distribution, and a range corresponding to the liver region is estimated in thus presumed matrix distribution. For this estimation, a threshold $T_2$ determined beforehand with respect to the matrix distribution is employed. A value of 0.2 or the like is used with respect to the modal value of 1 in the matrix distribution, for example, as the threshold $T_2$, and the assembly region of pixels whose frequency value in the matrix distribution falls within the range from 0.2 to 1 is extracted as a pixel region corresponding to normal substantial tissues of the liver.

Third Comparative Method

This method uses a differential image between images in both time phases. From the CT values of individual pixels within the VOI region in the images of the first and second time phases, a differential image is given by the following expression (4):

$$I_{1-2}(x) = I_1(x) - I_2(x) \quad (4)$$

A one-dimensional histogram concerning CT values of individual pixels in this differential image is taken as a sample distribution, and a matrix distribution estimated from this sample distribution is assumed to be a one-dimensional normal distribution. Namely, letting $Y_{1-2}(x)$ be the matrix distribution function, $Y_{1-2}(x)$ is represented by the following expression (5):

$$Y_{1-2}(x) = \exp\left\{-\frac{1}{2\sigma_{1-2}^2}[I_{1-2}(x) - \bar{I}_{1-2}]^2\right\} \quad (5)$$

where $I_{1-2}(x)$ is the CT value of pixels in the differential image, $\bar{I}_{1-2}$ is the average CT value within three times the half width (width from the center to a position where the frequency value becomes 0.5) centered at the modal position when the frequency value of the modal CT value in the sample distribution is taken as 1 (normalized with the lowest value taken as 0), and $\sigma_{1-2}$ is the standard deviation.

Then, the distribution determined by the above-mentioned expression (5) is presumed to be a matrix distribution, and a range corresponding to the liver region is estimated in thus presumed matrix distribution. For this estimation, a threshold $T_{1-2}$ determined beforehand with respect to the matrix distribution is employed. A value of 0.2 or the like is used with respect to the modal value of 1 in the matrix distribution, for example, as the threshold $T_{1-2}$, and the assembly region of pixels whose frequency value in the matrix distribution falls within the range from 0.2 to 1 is extracted as a pixel region corresponding to normal substantial tissues of the liver.

FIG. 13 shows a fundamental relationship between each comparative method and the method of the present invention. The first and second comparative methods using a single time phase can be regarded as a technique estimating the matrix distribution function as a one-dimensional normal distribution function from a histogram in which the two-dimensional characteristic space shown in FIG. 13 is simply projected onto axes (a) and (b) in the same chart in an adding fashion. The third comparative method using the differential image is a region extracting method simply taking account of changes under the influence of the contrast medium without considering CT values inherent in the individual tissues. This can be regarded as a technique estimating the matrix distribution function as a one-dimensional normal distribution function from a histogram in which the value obtained by subtracting the CT value of the second time phase from that of the first time phase is projected onto axis (c) in FIG. 13 in an adding fashion. By contrast, the method of the present invention is a technique considering both the influence of contrast medium and the CT value of liver region, which can be regarded as a technique estimating the matrix distribution function as a two-variable normal distribution function from a two-dimensional histogram in a two-dimensional characteristic space as indicated by (d) in FIG. 13, so as to surround the liver region directly.

For comparison, Receiver Operating Characteristic (ROC) analyses were used. Here, True Positive Fraction (TPF) and False Positive Fraction (FPF) were defined as in the following expressions (6) and (7):

$$TPF = \frac{A_C \cap A_R}{A_R} \quad (6)$$

where $A_R$ is the area selected by a radiologist, and $A_C$ is the area selected by a computer.

$$FPF = \frac{A_C \cap \overline{A}_R}{A_C} \quad (7)$$

where $\overline{A}_R$ is the area not selected by the radiologist, and $A_C$ is the area selected by the computer.

Evaluations were carried out in the stage of extracting the normal substantial tissue region of the liver and the stage of extracting the final liver region after postprocessing.

Evaluation in Normal Substantial Tissue Region Extracting Stage

After original images were subjected to smoothing processing by use of a Gaussian filter (with a standard deviation of σ), a normal substantial tissue region was extracted by each method. The standard deviation σ of the Gaussian filter was set to five steps (0 mm, 0.67 mm, 1.34 mm, 2.68 mm, and 5.36 mm). In each method, threshold processing (changing $T_1$, $T_2$, $T_{1-2}$, and $T_{1+2}$) was carried out in multiple steps (1000 steps), and the above-mentioned expressions (6) and (7) were calculated each time a normal substantial tissue region was obtained. One set of (TPF, FPF) was determined by one threshold processing operation, and an ROC curve was prepared by plotting all the points of (TPF, FPF), whereby evaluations were performed.

Results are shown in FIGS. 14 to 17. FIGS. 14 to 17 show results of the first comparative method, second comparative method, third comparative method, and method of the present invention, respectively. The results have revealed that the method of the present invention is clearly superior to the comparative methods. Here, the smoothing processing has been found to be optimal in the vicinity of σ=1.34 mm to 2.68 mm.

Evaluation in Final Liver Region Extracting Stage

Figure 18:
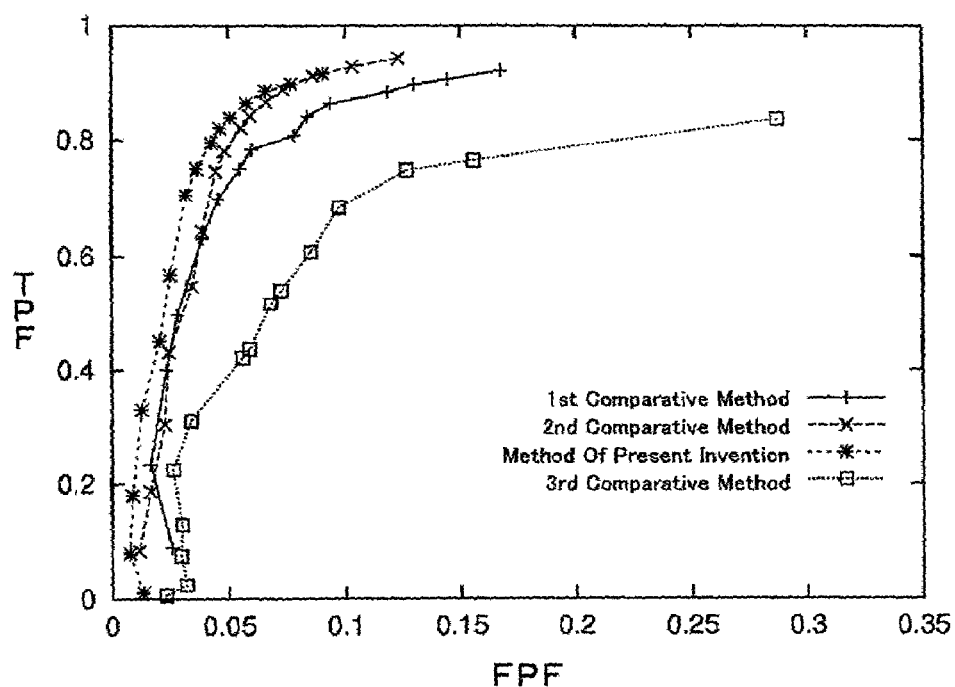
FIG. 18 is a graph showing ROC curves of the individual methods in a stage of extracting a final liver region.

In view of the results from the previous stage, with the smoothing parameter of original images fixed at σ=2.68 mm, a normal substantial tissue region was extracted by multiple steps (15 steps) of threshold processing (changing $T_1$, $T_2$, $T_{1-2}$, and $T_{1+2}$) in each method, and then postprocessing was performed, so as to extract the final liver region, whereby comparison was made. FIG. 18 shows results of comparison of thus obtained ROC curves. The results have proved that the method of the present invention is excellent in total.

In the ROC curves in FIG. 18, those in which points are densely concentrated on the upper left side indicate that results of performance evaluation fluctuate less upon changes in the threshold, and thus can be considered robust against the setting of threshold. In this regard, the method of the present invention has been proved to be superior to the comparative methods.

Figure 19:
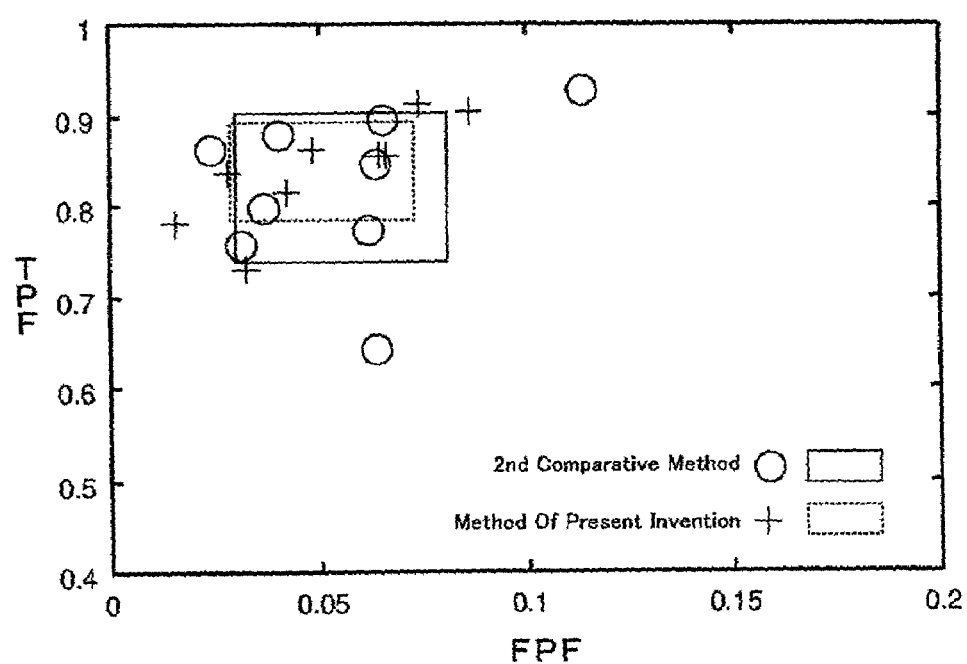
FIG. 19 is a chart showing data distributions of TPF and FPF in the second comparative method and the method of the present invention.

Each of the ROC curves in FIG. 18 is an average of the nine cases in total without reflecting the variance of data. FIG. 19 shows results reflecting the variance. FIG. 19 shows statuses of distribution of groups of data (TPF, FPF) obtained when the threshold was fixed in the vicinity of optimal values ($T_2$=0.2, $T_{1+2}$=0.05) in the first comparative method and the method of the present invention. The individual points are results of their corresponding cases, whereas areas surrounded by rectangles are standard deviation sections in the data of nine cases. These results have indicated that data expand less in the method of the present invention than in the second comparative method, whereby the liver region can be extracted accurately in a more stable fashion.

From the foregoing points, the method of the present invention can be considered superior to each of the comparative methods in terms of automatic extraction of the liver region.

Without being restricted to the above-mentioned embodiment, the region extracting method for medical images in accordance with the present invention can be modified in various manners.

For example, though the above-mentioned embodiment is based on the premise that CT values are reflected as pixel concentration values as they are, when there are differences between the gradation of CT values and that of pixels, so that the CT values are converted into different values, the pixel distribution may be determined by use of CT values before the conversion or by use of concentration values after the conversion.

Though a two-variable normal distribution function is used in the above-mentioned embodiment when estimating the matrix distribution from the sample distribution of pixels, those employable in the other distribution functions may be used as well. For example, curved surface approximations using B-spline curved surfaces or Fourier series, methods patching curved surfaces, and the like may considered with respect to forms of distribution in the characteristic space.

Further, the characteristic space is not restricted to two dimensions but can be expanded to multiple dimensions such as three dimensions. For extracting a plurality of different organic parts at the same time in such a characteristic space, a plurality of distribution functions may be applied to distributions in a multidimensional space.

The present invention is applicable not only to the liver region extraction by CT photography using a contrast medium, but also to extractions of other organic parts, medical images captured by use of radiation diagnosis systems such as MRI, nuclear medicine, CR, DSA, DR, and the like, and images captured by combinations of these systems.

Further, the present invention is applicable not only to regional extractions of organic parts, but also to volumetric measurement of organic parts and the like.

The region extracting method for a medical image in accordance with the present invention comprises the steps of determining from data of a plurality of images in which substantially the same region of the organic part is captured under measurement conditions different from each other measurement values concerning predetermined characteristics set for respective images concerning respective pixels located at positions corresponding to each other between the images; determining, in a multidimensional characteristic space defined by a plurality of coordinates indicating respective characteristics of the images, a sample distribution of the pixels relating to the region of the organic part, and applying a distribution function taking account of a correlation between respective characteristics of the images to the sample distribution so as to estimate a matrix distribution range; and extracting a tissue region; whereby the regional extraction of an organic part can be carried out uniquely in a stable fashion. In particular, an operation of extracting a liver region from CT images by use of a contrast medium can be automated, so as to improve the efficiency of extracting operation.

What is claimed is:

1. A region extracting method for a medical image in which a region of a predetermined organic part from one patient is extracted from an image captured for medical use, said method comprising the steps of:

determining from data of a plurality of images in which substantially the same region of said organic part from one patient is captured under measurement conditions different from each other, wherein measurement values concern predetermined characteristics set for respective images concerning respective pixels located at positions corresponding to each other between said images;

determining, in a multidimensional characteristic space defined by a plurality of coordinates indicating respective measurement values of said images, a sample distribution of said pixels relating to said region of said organic part employing said respective measurement values of said characteristics as coordinate values, and applying a distribution function taking account of a correlation between said respective characteristics of said images to said sample distribution so as to estimate a matrix distribution range corresponding to a predetermined tissue region belonging to said organic part; and extracting an assembled area of said pixels included in said matrix distribution range in each of said images as a region corresponding to said tissue region;

wherein said characteristic space in each of said images is a concentration value of each pixel;

wherein said image is a CT image, and wherein said plurality of images are images in respective time phases different from each other in terms of time from when a contrast medium is injected until imaging; and wherein said organic part is a liver, wherein said sample distribution is a two-dimensional histogram concerning respective concentration values of pixels in images of two time phases different from each other, and wherein said distribution function is a two-variable normal distribution function.

2. A region extracting method for a medical image according to claim 1, wherein said two time phases different from each other may be a first arterial phase captured immediately after a contrast medium is injected into said liver and a second arterial phase captured after several tens of seconds from said contrast medium injection in a single respiration-holding time.

3. A region extracting method for a medical image according to claim 2, wherein said image is a multislice CT image.

* * * * *